(12) United States Patent
Sasaki

(10) Patent No.: US 11,907,049 B2
(45) Date of Patent: Feb. 20, 2024

(54) INFORMATION PROCESSING APPARATUS, METHOD OF CONTROLLING THE SAME, AND STORAGE MEDIUM WITH FEATURES FOR UPDATING CODE AND DATA AREAS OF NON-VOLATILE MEMORY

(71) Applicant: Canon Kabushiki Kaisha, Tokyo (JP)

(72) Inventor: Hidemi Sasaki, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 78 days.

(21) Appl. No.: 17/573,766

(22) Filed: Jan. 12, 2022

(65) Prior Publication Data
US 2022/0222133 A1 Jul. 14, 2022

(30) Foreign Application Priority Data
Jan. 13, 2021 (JP) ................................ 2021-003727

(51) Int. Cl.
*G06F 11/07* (2006.01)
*G06F 21/57* (2013.01)
*G06F 9/4401* (2018.01)
*G06F 11/14* (2006.01)

(52) U.S. Cl.
CPC ........ *G06F 11/0733* (2013.01); *G06F 9/4411* (2013.01); *G06F 11/1458* (2013.01); *G06F 21/572* (2013.01)

(58) Field of Classification Search
CPC ...... G06F 21/572; G06F 21/575; G06F 21/64; G06F 21/57; G06F 8/63; G06F 8/71; G06F 8/658; G06F 11/0733; G06F 11/1433; G06F 11/1458
See application file for complete search history.

(56) References Cited

U.S. PATENT DOCUMENTS

| | | | | |
|---|---|---|---|---|
| 6,594,723 B1* | 7/2003 | Chapman | .............. | G06F 9/4401 713/1 |
| 6,757,838 B1* | 6/2004 | Chaiken | ................ | G06F 9/4403 714/E11.133 |
| 11,797,297 B2* | 10/2023 | Kim | ......................... | H04L 67/34 |
| 2003/0066062 A1* | 4/2003 | Brannock | ............... | G06F 8/654 717/169 |
| 2009/0320012 A1* | 12/2009 | Lee | ........................... | G06F 8/65 714/758 |
| 2010/0082955 A1* | 4/2010 | Chhabra | ............... | H04L 9/3247 713/1 |
| 2014/0082373 A1* | 3/2014 | Colnot | .................. | G06F 21/575 713/193 |
| 2019/0258470 A1* | 8/2019 | Miyake | ..................... | G06F 8/65 |
| 2023/0169172 A1* | 6/2023 | Edwards | ................. | G06F 8/654 726/21 |

FOREIGN PATENT DOCUMENTS

JP    2008225576 A    9/2008

* cited by examiner

*Primary Examiner* — Joseph O Schell
(74) *Attorney, Agent, or Firm* — Venable LLP

(57) ABSTRACT

The present information processing apparatus comprises a non-volatile memory that has a first portion including a code area configured to hold a program and a data area configured to hold data. In addition, the information processing apparatus acquires update data of a first portion, and updates the first portion with the acquired update data. In the updating process, at least a portion of the program held in the code area is deleted before updating the contents of the data area, and after updating the contents of the data area, updating to the code area is completed.

15 Claims, 6 Drawing Sheets

INFORMATION PROCESSING APPARATUS, METHOD OF CONTROLLING THE SAME, AND STORAGE MEDIUM WITH FEATURES FOR UPDATING CODE AND DATA AREAS OF NON-VOLATILE MEMORY

BACKGROUND OF THE INVENTION

Field of the Invention

The present invention relates to an information processing apparatus, a method of controlling the same, and a storage medium.

Description of the Related Art

When the power is turned on in an information processing apparatus, a CPU provided in the information processing apparatus reads a boot program stored in a non-volatile memory into a work area such as a RAM and executes it, thereby activating the system. Japanese Patent Laid-Open No. 2008-225576 proposes that not only a code area for holding a program but also a data area for holding data be arranged on one non-volatile memory in an information processing apparatus. Specifically, in the code area, a command sequence to be executed by the CPU when executing a boot program is stored. In the data area, various setting information to be referenced by the CPU when executing a boot program is stored.

Meanwhile, in recent years, there has been strong demand for information processing apparatuses that handle personal information and confidential information to enhance security. As one security enhancement, an automatic recovery function is required to protect the information processing apparatus from unintentional data corruption and intentional data tampering. The automatic recovery function protects the boot program as follows. First, in the non-volatile memory area in which the boot program is stored, in addition to a boot unit for activation, a backup unit for storing backup data is provided. Then, before executing the boot program, it is verified that there is no data corruption or data tampering of the boot program. In a case where data corruption or data tampering is detected, the information processing apparatus can maintain a continuous usage state by overwriting the contents of the boot unit by using the backup unit even in a case where portion of the data of the boot unit is corrupted.

As another security enhancement, there is the need for countermeasures against being compromised due to the development of the computer technology after the product is released to the market. A firmware update function is necessary as a countermeasure against being compromised. The firmware update function is processing for acquiring a boot program from outside the device via a network or the like and updating the contents of the boot program on non-volatile memory. By this, the newest security techniques and bug fix patches for the boot program can be received, and a state in which the information processing apparatus is more secure can be maintained.

Here, data corruption and data tampering detection for a boot program in the information processing apparatus that has both a code area and a setting data area on one non-volatile memory will be described in detail. In the code area is a command sequence which is to be executed by the CPU when executing the boot program, and is static information independent of an individual product. When the boot program is compiled and linked, the contents of the code area are uniquely determined. Signature data generated for the code areas using a digital signature technique is also independent of an individual product. By using the signature data, data corruption and data tampering with the code area can be detected.

Meanwhile, the setting data area is data that stores various setting information referred to by the CPU when executing the boot program, and is information that depends on individual products. It is assumed that a portion of the setting information is rewritten not only in the assembling stage of the information processing apparatus but also during use. In other words, the contents of the setting data area are variable, and it is difficult to generate signature data therefor in advance. As an alternative to the verification of the setting data area, an error detection code technology can be used. An example of an error detection code technology is a checksum. The checksum is an algorithm used to calculate a numeric value that is uniquely determined for various setting information. Each time the setting information is changed, the numeric value is calculated again, and stored in the setting data area. Thus, if a portion of the setting information is intentionally or unintentionally rewritten but the checksum is not updated at the same time, it can be considered that data corruption has occurred.

However, there is a problem described below in the above prior art. The process for updating the non-volatile memory in the information processing apparatus that holds both the code area and the setting data area in one non-volatile memory is executed as a portion of an automatic recovery process or as a portion of a firmware update process. In the non-volatile memory update process, it is assumed that the code area and the setting data area on the non-volatile memory are completely updated to new content as a use case of a normal system. That is, when the firmware update process is executed, the information processing apparatus activates the boot program based on the updated code area and the updated setting data area at the next power activation.

However, as a practical problem, firmware update processing is not necessarily successful. For example, an exceptional use case may occur in which the power of the information processing apparatus is disconnected due to a power failure or the like during the update processing of the non-volatile memory. When the power of the information processing apparatus is disconnected, the information in the non-volatile memory is incomplete. In particular, data corruption of the setting data area for which the checksum passes (by chance or intentionally) even though the setting information is incorrect may occur. As a result, in the worst use case in which the update processing of the non-volatile memory fails, the information processing apparatus is not able to activate normally even though it has an automatic recovery function. The code area can be automatically recovered by detecting occurrence of data corruption or alteration by digital signature verification. However, with a setting data area for which digital signature verification is not available and only checksum verification is used, the occurrence of data corruption or alteration may be overlooked, which has a significant impact on the apparatus. For example, it will be necessary to send the information processing apparatus to the manufacturer, or to have a serviceman visit a user to replace parts of the information processing apparatus. These impose the inconvenience that the user temporarily cannot use the information processing apparatus.

In the above-mentioned prior art, for example, by moving the contents held in the code area to another area at the time of turning on the main power supply or at the time of transitioning to the energy saving mode, the number of times the various data is rewritten is increased, and the life of the non-volatile memory is extended by wear leveling. However, there is no mention of countermeasures against the possibility that an update state of the code area and the setting data area may become inconsistent due to power supply disconnection during the update process.

SUMMARY OF THE INVENTION

The present invention enables realization of a mechanism to enhance, in a non-volatile memory in which both a code area and a setting data area are provided on one non-volatile memory, failure tolerance against forced interruption during processing for updating of the non-volatile memory.

One aspect of the present invention provides an information processing apparatus, comprising: a non-volatile memory that has a first portion including a code area configured to hold a program and a data area configured to hold data, and at least one processor that executes a program to: acquire update data for the first portion; and update the first portion by the acquired update data, wherein the at least one processor executes a program in the non-volatile memory to: delete at least a portion of the program held in the code area before updating contents of the data area, and after updating the contents of the data area, complete updating of the code area.

Another aspect of the present invention provides a method of controlling an information processing apparatus comprising a non-volatile memory that has a first portion including a code area for holding a program and a data area for holding data, the method comprising: acquiring update data for the first portion; and updating the first portion by the acquired update data, wherein in the updating, at least a portion of the program held in the code area is deleted before updating the contents of the data area, and after updating the contents of the data area, updating to the code area is completed.

Still another aspect of the present invention provides a non-transitory storage medium operable to store a program for causing a computer to execute each step of a method of controlling an information processing apparatus comprising a non-volatile memory that has a first portion including a code area for holding a program and a data area for holding data, the method comprising: acquiring update data for the first portion; and updating the first portion by the acquired update data, wherein in the updating, at least a portion of the program held in the code area is deleted before updating the contents of the data area, and after updating the contents of the data area, updating to the code area is completed.

Further features of the present invention will be apparent from the following description of exemplary embodiments with reference to the attached drawings.

DESCRIPTION OF THE EMBODIMENTS

Figure 1:
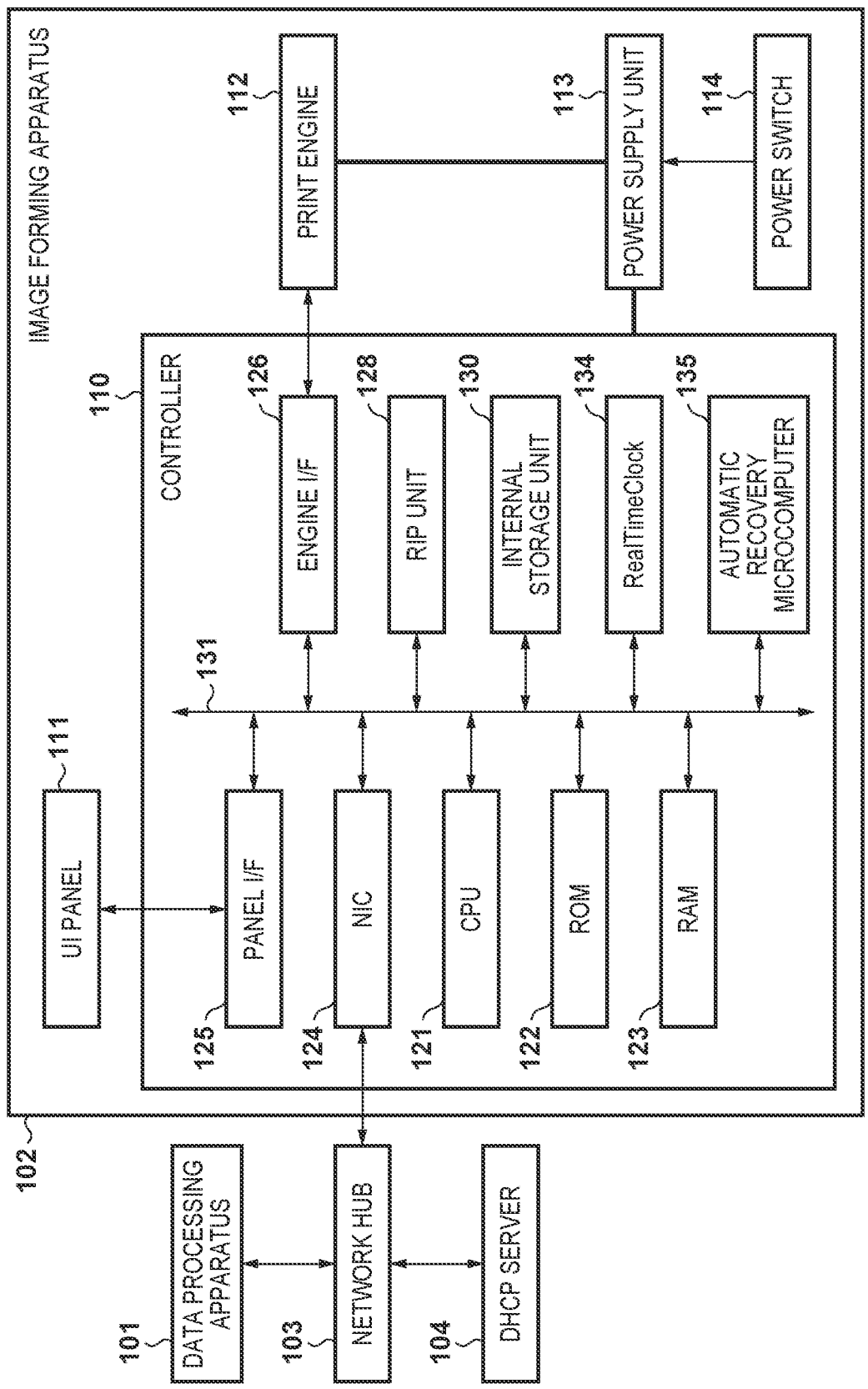
FIG. 1 is a block diagram illustrating a configuration of an image forming apparatus according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Hereinafter, a first embodiment of the present invention will be described. In the present embodiment, an image forming apparatus is taken as an example of an embodiment of the information processing apparatus, and the processing for automatic recovery thereof will be mainly described. It should be noted that the present invention is not intended to be limited to only an image forming apparatus such as a multifunction peripheral or a printer, and can be applied to other information processing apparatuses. As another information processing apparatus, for example, a projector, a scanner, a camera, a vending machine, a refrigerator, a smart phone, or the like can be applied. Further, in the following description, the boot program is also referred to as "Bootrom".

First, a configuration example of an image forming apparatus according to the present embodiment will be described with reference to FIG. 1. The configuration described below is merely an example, and there is no intention of limiting the present invention, and an additional configuration or an alternative configuration may be provided.

The image forming apparatus 102 is connected to the network hub 103 through an NIC (network interface card), and is connected to the data processing apparatus 101 and DHCP server 104 through the network hub 103. The network hub 103 is a hub for performing network communication between the data processing apparatus 101, the image forming apparatus 102, and the DHCP server 104. In this embodiment, a device associated with a single network hub is described in the form of a local network connection. However, there is no intention to exclude other network configurations, and the present invention can be applied thereto.

The data processing apparatus 101 (for example, a PC) generates PDL (Page Description Language) data and transmits the PDL data to the image forming apparatus 102. In firmware update processing described later, the data processing apparatus 101 transmits firmware data to the image forming apparatus 102. The DHCP server 104 is a server for receiving a request to acquire network setting information based on DHCP (Dynamic Host Configuration Protocol) and responding to the network setting information.

The image forming apparatus 102 (for example, a laser printer) is an apparatus that receives PDL data from the data processing apparatus 101, and forms an image on a sheet based on the image data. The image forming apparatus 102 may be a multifunction peripheral having a scanner function, a FAX function, or the like. The image forming apparatus 102 includes a controller 110, a UI panel 111, a print engine 112, a power supply unit 113, and a power switch 114.

The controller 110 is a controller board that generates bitmap data for printing based on the PDL data transmitted from the data processing apparatus 101 and transmits the bitmap data to the print engine 112. It should be noted that the controller 110 itself can generate PDL data and make a print instruction in order to print the settings and state of the image forming apparatus 102 as a report.

The UI panel 111 is a user interface and includes a display unit for transmitting various kinds of information to the user and an operation unit for accepting various operations from the user. The UI panel 111 may include, for example, a touch panel or the like in addition to physical buttons. Further, the UI panel 111 may be provided with a function to notify the user of an error or a warning generated in the image forming apparatus 102 by the LED by lighting or blinking a light. Alternatively, the image forming apparatus 102 may be provided with a function to notify, by sound, the user of an error or a warning generated in the image forming apparatus 102 by a buzzer or the like.

The print engine 112 is a print engine that forms an image on a sheet using toner in an electrophotographic method based on bitmap data received from the controller 110. The image forming method may be, for example, an inkjet method using ink as a recording material, rather than an electrophotographic method using toner as a recording material. The print engine 112 includes recording material of a plurality of colors, and can perform color printing according to PDL data. Further, the print engine 112 includes a plurality of paper feed stages, and can feed sheets from the paper feed stages designated by the PDL data.

The power supply unit 113 is a power unit for supplying power to each component constituting the image forming apparatus 102. It is responsible for generating and supplying the voltages necessary to operate each part. The power switch 114 is a switch for accepting a power activation and disconnection instruction from the user. When the user presses the power switch 114 while the image forming apparatus 102 is in the OFF state, the power switch pressing event is notified to the power supply unit 113. Thereafter, the power supply unit 113 starts supplying power to each part constituting the image forming apparatus 102.

The controller 110 includes a CPU 121, a ROM 122, a RAM 123, an NIC 124, a panel I/F 125, an engine I/F 126, a RIP unit 128, an internal storage unit 130, a real-time clock 134, and an automatic recovery microcomputer 135. The components can transmit and receive signals to and from each other via a bus 131. The CPU 121 is a central processing arithmetic apparatus for executing various programs. The various programs may include PDL interpreter processing for analyzing the PDL data transmitted from the data processing apparatus 101 and converting the PDL data into intermediate data. The ROM 122 is a non-volatile memory that holds Bootrom which is executed triggered by the reset release of the CPU 121. Details thereof will be described later with reference to FIG. 2. The RAM 123 is a volatile memory for storing temporary information when the CPU 121 operations various programs.

The NIC 124 is a network interface controller that interconnects a device outside the image forming apparatus 102 by a network and relays data communication or transmits and receives data between the two devices. In addition to a communication mode for wired connection, a communication mode for wireless connection may be used in applying the present invention. The panel I/F 125 is an interface for interconnecting the UI panel 111 and the controller 110 and relaying data communicated between the two, i.e., transmission and reception of data. The engine I/F 126 is an interface for interconnecting the print engine 112 and the controller 110 and relaying data communicated between the two, i.e., transmission and reception of data.

The RIP unit 128 converts the intermediate data into bitmap data and loads the bitmap data into the RAM 123. In the present invention, a dedicated RIP unit 128 independent of the CPU 121 converts intermediate data into a bitmap for example. The present invention is not limited to this, and for example, the CPU 121 may directly convert PDL data received from the data processing apparatus 101 into bitmap data without providing it to the RIP unit 128.

The internal storage unit 130 is non-volatile storage area that holds an operating system (OS) which is activated by Bootrom. For example, the internal storage unit 130 can be realized by an eMMC (embedded MMC), a hard disk drive, a solid state drive, or the like. The internal storage unit 130 can ensure a relatively inexpensive storage area of a large capacity. Therefore, the program of the OS and the data used by the OS may be stored in the internal storage unit 130.

The real-time clock 134 is a hardware chip for managing time information in the image forming apparatus 102 in a non-volatile manner. The real-time clock 134 is driven by a battery which is a power supply that is independent of the power supply unit 113, and has functions such as periodically updating time information even after the power supply of the image forming apparatus 102 is disconnected.

The automatic recovery microcomputer 135 is a microcomputer for an automatic recovery process in which the validity of the content of the ROM 122 is verified and the content of the ROM 122 is recovered prior to CPU 121 executing the program included in the ROM 122. The automatic recovery microcomputer 135 is also responsible for releasing the reset state of the CPU 121 and triggering Bootrom to be started by the CPU 121. Details of the automatic recovery processing will be described later with reference to FIG. 3.

<ROM Data Configuration>

Figure 2:
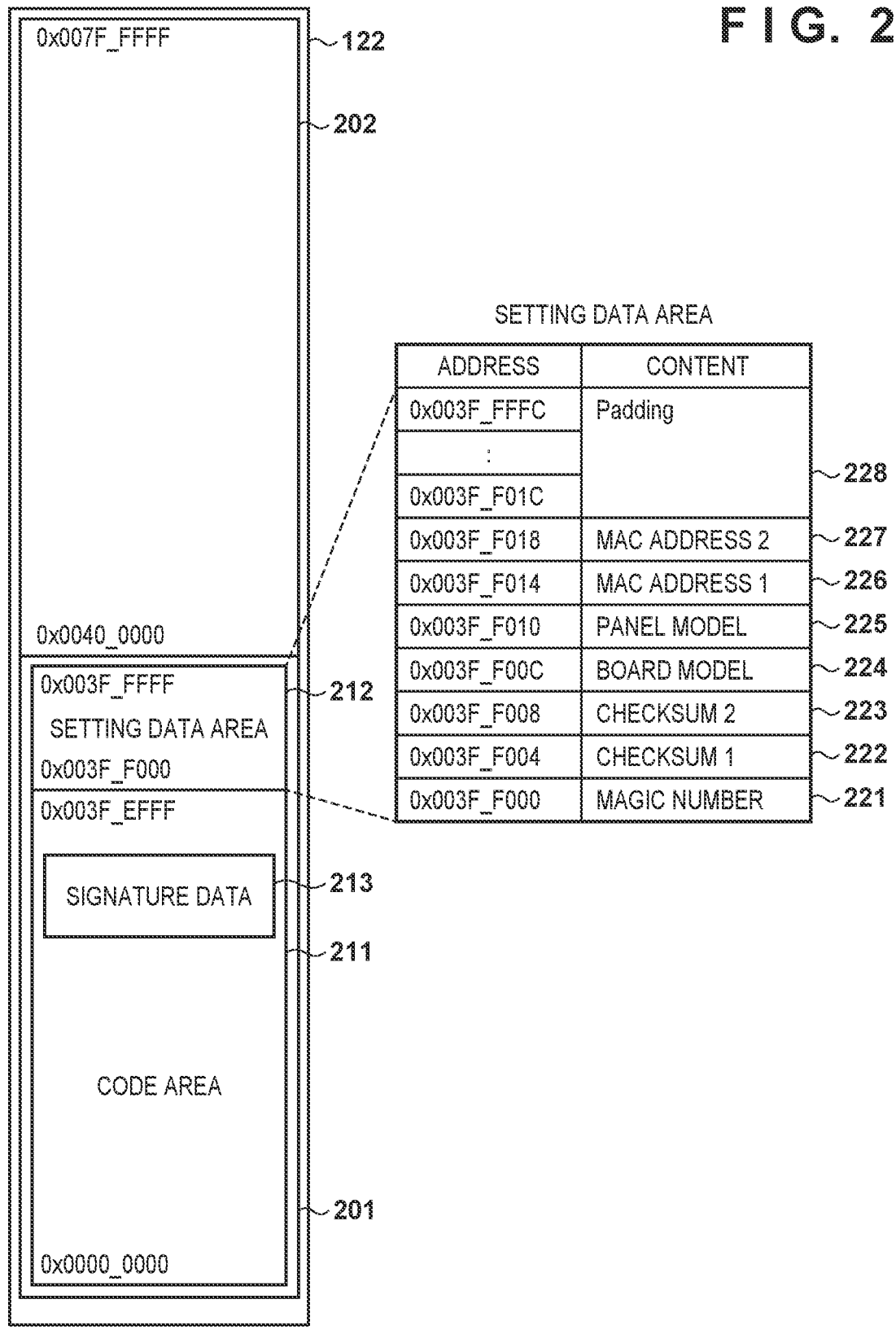
FIG. 2 is a diagram illustrating a configuration of data stored on a ROM 122 according to an embodiment.

Next, an example of a configuration of data stored on a ROM 122 according to the present embodiment will be described with reference to FIG. 2. The ROM 122 includes a boot unit 201 and a backup unit 202 as a backup area. In the present embodiment, storage allocation is exemplified on the assumption that NAND FLASH of 64 Mbit/8 MB is adopted. The present invention can also be applied to non-volatile memories having different capacities. The boot unit 201 and the backup unit 202 may be provided in different non-volatile memories, and the present invention may be applied to physical non-volatile memories having various capacities. Alternatively, the present invention can also be applied to a case where the backup unit 202 is realized by another non-volatile memory. The ROM 122 is divided entirely into several sectors, each of which includes a number of pages. When data is written on the ROM 122, new data shall be written on a page-by-page basis after the old data is deleted on a sector-by-sector basis.

The boot unit 201 is a data portion in which Bootrom which is used when the image forming apparatus 102 is activated is stored. The boot unit 201 is an area assigned to, for example, 0x0000_0000 through 0x003F_EFFF, and includes a code area 211 and a setting data area 212.

The backup unit 202 is data used when the automatic recovery microcomputer 135 executes verify and recovery processing when the image forming apparatus 102 is activated. The content of the backup unit 202 is the same as that of the boot unit 201. For example, when the setting data area 212 of the boot unit 201 is updated, the same contents are updated for the corresponding partial area in the backup unit 202.

Here, the code area 211 comprising the boot unit 201 will be described in detail. The code area 211 includes instructions that comprise a program that the CPU 121 starts to execute immediately after power is activated. The code area 211 is an area assigned to 0x0000_0000 through 0x003F_EFFF. When the CPU reset state is released, the CPU 121 executes the program written in a first area on the ROM 122. The code area 211 also includes signature data 213 common to individual products, which is referred to when the automatic recovery microcomputer 135 detects data corruption or tampering in the code area 211.

The signature data 213 is data encrypted using a public key encryption algorithm using a secret key generated by a key generation algorithm for a digest calculated from data other than the signature data 213 in the code area 211. For the generation of a digest, for example, a SHA1 algorithm can be employed. Here, the reason why the signature data 213 is excluded in the digest generation is that the signature data 213 is not fixed at the time of generating the signature data 213. Therefore, at the time of generating the signature data 213, predictable data such as zeros or all FFs is embedded as dummy data, and a digest is calculated. Signature data generated by applying a public key encryption technology encryption algorithm to the digest using a secret key generated in advance by a key generation algorithm of one of the various public key encryption technologies is stored as the signature data 213. The data address at which the signature data 213 is held in the code area 211 may be any address at/from which storage/acquisition by the automatic recovery microcomputer 135 is possible and whose content is predictable. For example, it may be the start of the code area 211 or the end of the code area 211. As for the position of the signature data 213, the present invention can be applied to any position on the code area 211 as long as the above condition is satisfied.

The setting data area 212 includes setting information to be referred to when the CPU 121 starts executing the program when the reset release state of CPU 121 is released. The setting data area 212 is an area assigned to 0x003F_F000 through 0x003F_FFFF. The setting data area 212 includes a magic number 221, checksum information 222 and 223, board type information 224, panel type information 225, MAC address information 226 and 227, and padding 228.

The magic number 221 is identification information for indicating that the setting data area 212 is held. Checksum information 222 and 223 are values uniquely set by a specific algorithm based on data included in the setting data area 212, and are individual product dependent values. Note that a checksum is one type of error detection code algorithm, and other error detection code algorithm may be also applied. The board type information 224 is information for representing the hardware configuration of the image forming apparatus 102. In the present embodiment, a laser printer is exemplified. Meanwhile, when configuring a multifunction peripheral having a scanner function or the like, it is complicated to prepare Bootrom for each hardware configuration both for development and manufacturing reasons. Therefore, it is assumed that board type information 224 indicating a hardware configuration is provided in the setting data area 212, and the board type information 224 is written in the product assembling process in the factory. By this, the same Bootrom can be reused between multiple models with different boards.

The panel type information 225 is information for expressing the type of the UI panel 111. As product requirement specification may support a configuration where UI panels 111 having different screen sizes can be exchanged even with the same controller 110. Therefore, the setting data area 212 includes panel type information 225 as setting information for indicating what size UI panel 111 is mounted.

The MAC address information 226 and the MAC address information 227 are information for identifying the NIC 124 assigned to the image forming apparatus 102. Since the MAC address assigned to the product is six digits, it is assumed that zero is held for unused areas. MAC addresses are individually assigned to the respective image forming apparatuses 102 in the manufacturing process in the factory so as not to overlap with each other. The padding 228 is the remaining area assigned to the setting data area 212, and is filled with 0xFFFF_FFFF as a dummy value.

<Overview of Automatic Recovery Processing>

Figure 3:
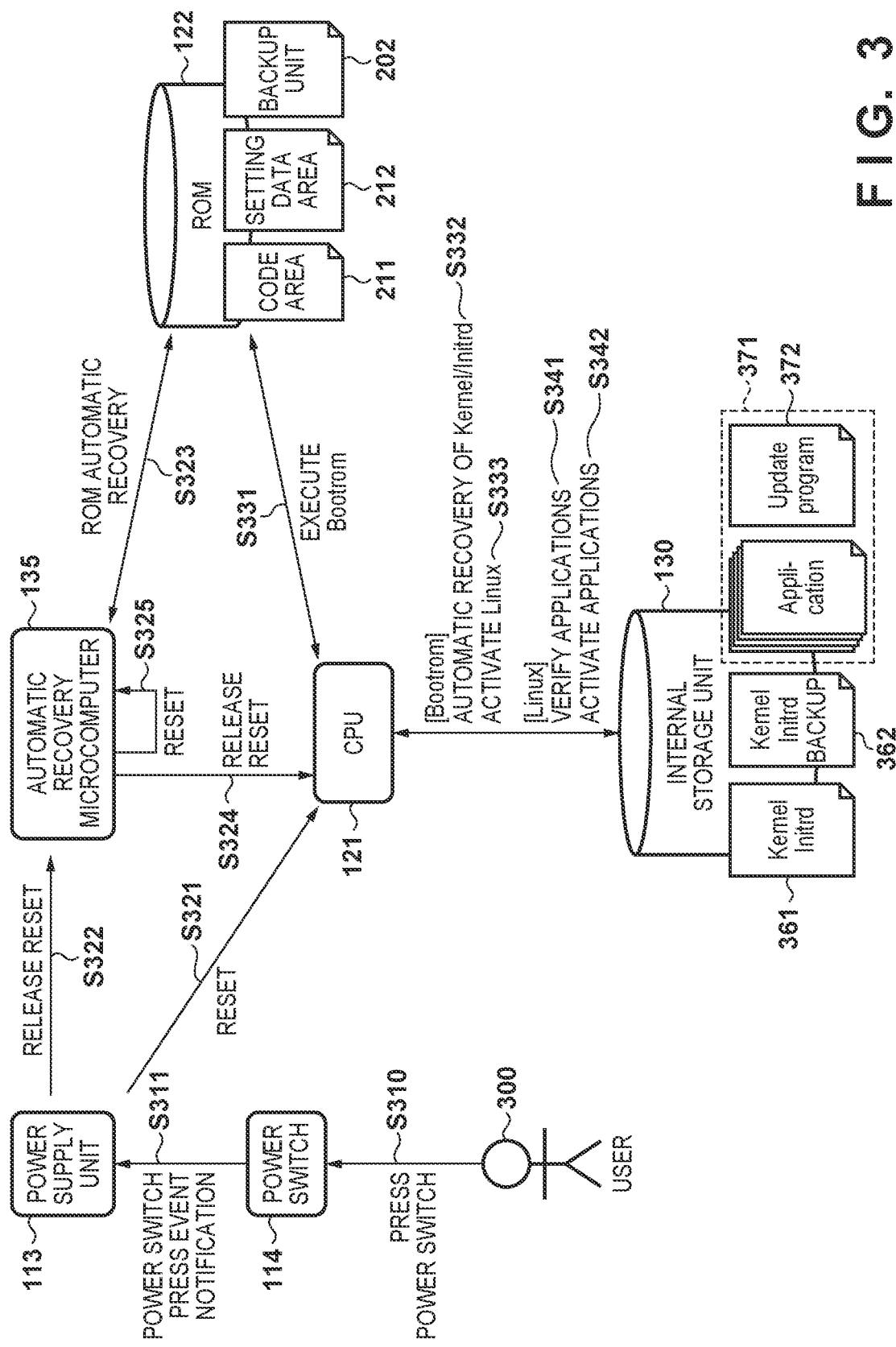
FIG. 3 is a diagram illustrating an overview of the entire automatic recovery process according to an embodiment.

Next, an overview of the entire automatic recovery process will be described with reference to FIG. 3. Reference numeral 300 denotes a user of the image forming apparatus 102.

In step S310, a pressing of the power switch 114 by the user 300 is detected. Subsequently, in step S311, upon detecting that the power switch 114 has been pressed by the user 300, the power switch pressing event is notified to the power supply unit 113. Incidentally, configuration may be taken to perform signal control in order to eliminate chattering during switch pressing in the power switch 114. Countermeasures against chattering may be implemented by using an FPGA, or may be implemented by a small-sized microcomputer.

Next, in step S321, the power supply unit 113 supplies power to the CPU 121 when the power switch 114 notifies the power switch pressing event. In the present embodiment, the default state of the CPU 121 at the time of power activation is set to a reset state. Next, in step S322, the power supply unit 113 performs a power supply to the automatic recovery microcomputer 135 when the power switch 114 notifies the power switch pressing event. In the present embodiment, the default state of the automatic recovery microcomputer 135 at the time of power activation is set to a reset release state. Theses controls for resetting the CPU are performed by transmitting a HIGH or LOW signal to a reset signal line provided in the CPU.

Upon accepting a reset release, the automatic recovery microcomputer 135 verifies whether or not data corruption due to aging degradation or data tampering has occurred based on the ROM 122 to the code area 211. That is, the automatic recovery microcomputer 135 verifies the validity of the content of the code area 211 of the ROM 122. When data corruption or data tampering is detected, that is, when validity verification fails, the automatic recovery microcomputer 135 recovers the code area 211 and the setting data area 212 based on the content of the backup unit 202 in step S323. Details of the automatic recovery processing will be described later with reference to FIG. 4.

Next, in step S324, the automatic recovery microcomputer 135 performs reset release of CPU 121. In addition, in step S325, the automatic recovery microcomputer 135 transitions to a reset state so that operation of the automatic recovery microcomputer 135 stops. The transition to the reset state may be realized by the automatic recovery microcomputer 135 controlling its own reset state, or may be realized by the automatic recovery microcomputer 135 waiting in a WFI (Wait for Interrupt) state.

Next, in step S331, when the CPU 121 is reset-released by the automatic recovery microcomputer 135, Bootrom is executed using the code area 211 and the setting data area 212 included in the ROM 122. Incidentally, when the CPU 121 has received a reset release from the automatic recovery microcomputer 135, the CPU 121 may be configured to put the automatic recovery microcomputer 135 in a reset state.

The CPU 121 verifies, via Bootrom, whether data corruption or data tampering has occurred on Kernel/Initrd 361 which is included in the internal storage unit 130. Kernel/Initrd 361 are programs/data for activating Linux (registered trademark), which is one type of OS. When data corruption or data tampering is detected in Kernel/Initrd 361, in step S332, the CPU 121 recovers Kernel/Initrd 361 based on a Kernel/Initrd backup 362 via Bootrom. Then, in step S333, CPU 121 activates Linux using Kernel/Initrd via Bootrom.

Next, the CPU 121 verifies whether the various applications 371 have data corruption or data tampering through the activated Linux. When data corruption or data tampering is detected, in step S341, the CPU 121 notifies the user 300 of data corruption through the activated Linux. Then, in step S342, CPU 121 activates the various applications 371 through the activated Linux. Various applications 371 may include a firmware updating program 372.

Although the description is omitted in the present embodiment for simplification, a backup may be prepared for the various applications 371, and recovery may be performed when data corruption or data tampering is detected.

<Detailed Procedure of Automatic Recovery Processing>

Figure 4:
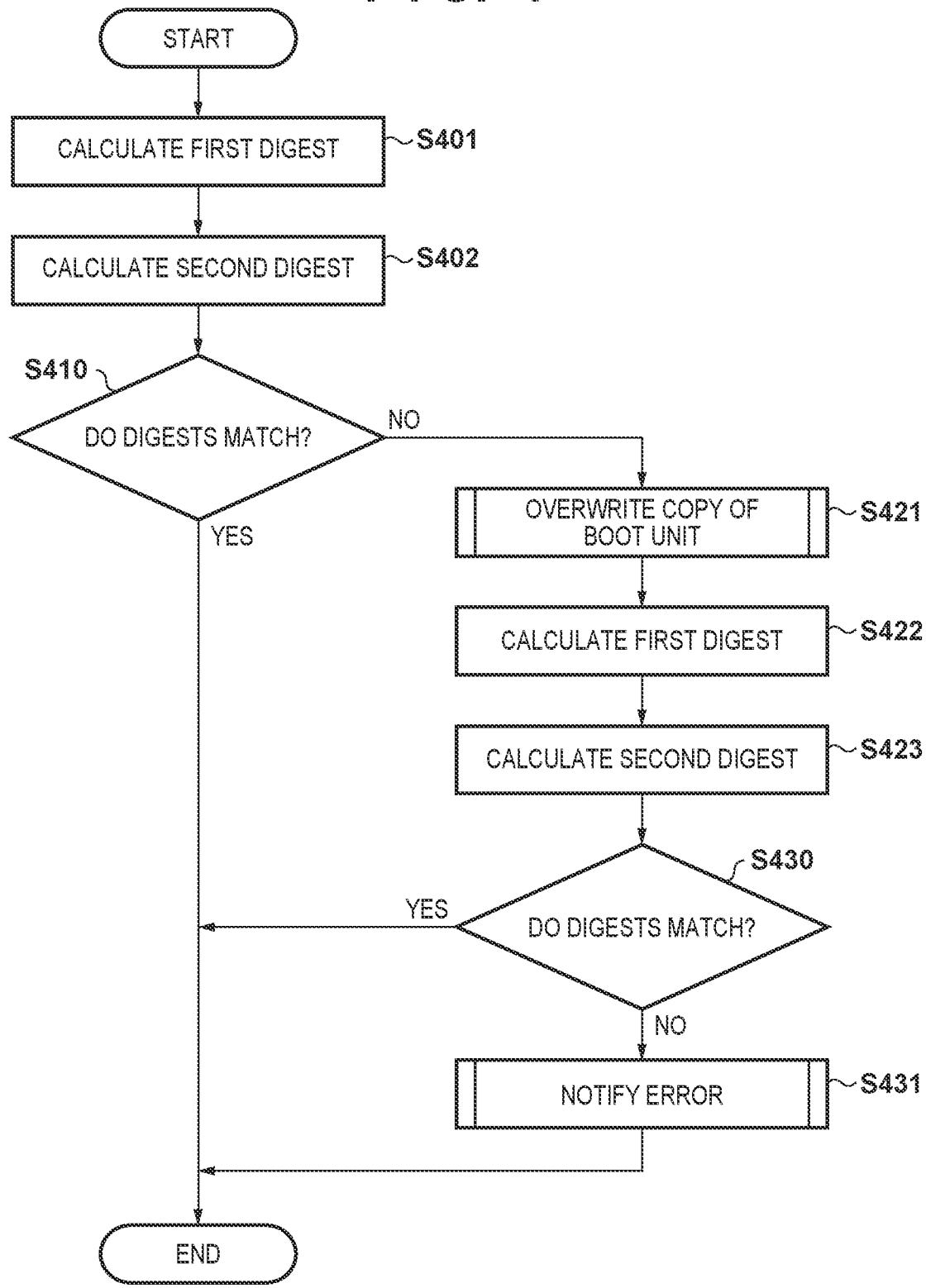
FIG. 4 is a flowchart for automatic recovery processing according to an embodiment.

Next, a processing procedure of the automatic recovery processing according to the present embodiment will be described with reference to FIG. 4. The process described below is detail of the process performed in the above-described step S323, and is executed by the automatic recovery microcomputer 135.

In step S401, the automatic recovery microcomputer 135 decrypts the signature data 213 stored in the code area 211 in the boot unit 201 of the ROM 122 using the public key, and calculates a first digest. The public key information may be held in advance in the automatic recovery microcomputer 135. Alternatively, in another embodiment, the public key information may be held within the code area 211. There is no intention to limit the present invention to public key decryption, and decryption algorithms for various public key encryption techniques such as elliptic-curve cryptography and RSA encryption and the like can be applied. Subsequently, in step S402, the automatic recovery microcomputer 135 calculates a second digest for the code area 211 except for the signature data 213 using the hash function. The same algorithm used to generate the second digest is applied as the algorithm used to generate the signature data 213.

Next, in step S410, the automatic recovery microcomputer 135 determines whether or not the first digest matches the second digest. If the digests match, the automatic recovery microcomputer 135 determines, by the signature data 213, that the contents of the code area 211 data are not corrupted or tampered with. Therefore, when the digests match, the automatic recovery microcomputer 135 ends the automatic recovery processing. Meanwhile, if the digests do not match, the automatic recovery microcomputer 135 determines that at least a portion of the contents of data in the code area 211 including the signature data 213 is corrupted or tampered with, and the processing advances to step S421.

In step S421, the automatic recovery microcomputer 135 overwrites a copy of the contents of the backup unit 202 to the boot unit 201. Details of the process of step S421 will be described later with reference to FIG. 5. Subsequently, in step S422 and step S423, the automatic recovery microcomputer 135 executes the same processing as in step S401 and step S402. Thus, the automatic recovery microcomputer 135 performs signature verification processing on the code area 211 in the boot unit 201 overwritten from the backup unit 202.

Thereafter, in step S430, the automatic recovery microcomputer 135 determines whether or not the first digest matches the second digest. If the digests match, it is determined that the contents of the code area 211 data after the recovery are not corrupted or tampered with. Therefore, when the digests match, the automatic recovery microcomputer 135 ends the automatic recovery processing. Meanwhile, if the digests do not match, the automatic recovery microcomputer 135 determines that at least a portion of the contents of data in the code area 211 including the signature data 213 is corrupted or tampered with, and the processing advances to step S431. In this case, both the contents of the boot unit 201 and the contents of the backup unit 202 are in an abnormal state and cannot be normally activated. In step S431, the automatic recovery microcomputer 135 notifies the user of an error and interrupts the activation process. More specifically, the automatic recovery microcomputer 135 notifies the user via the UI panel 111 that the activation process has failed by sound, light, or the like, as error notification processing.

<Non-Volatile Memory Update Processing>

Figure 5:
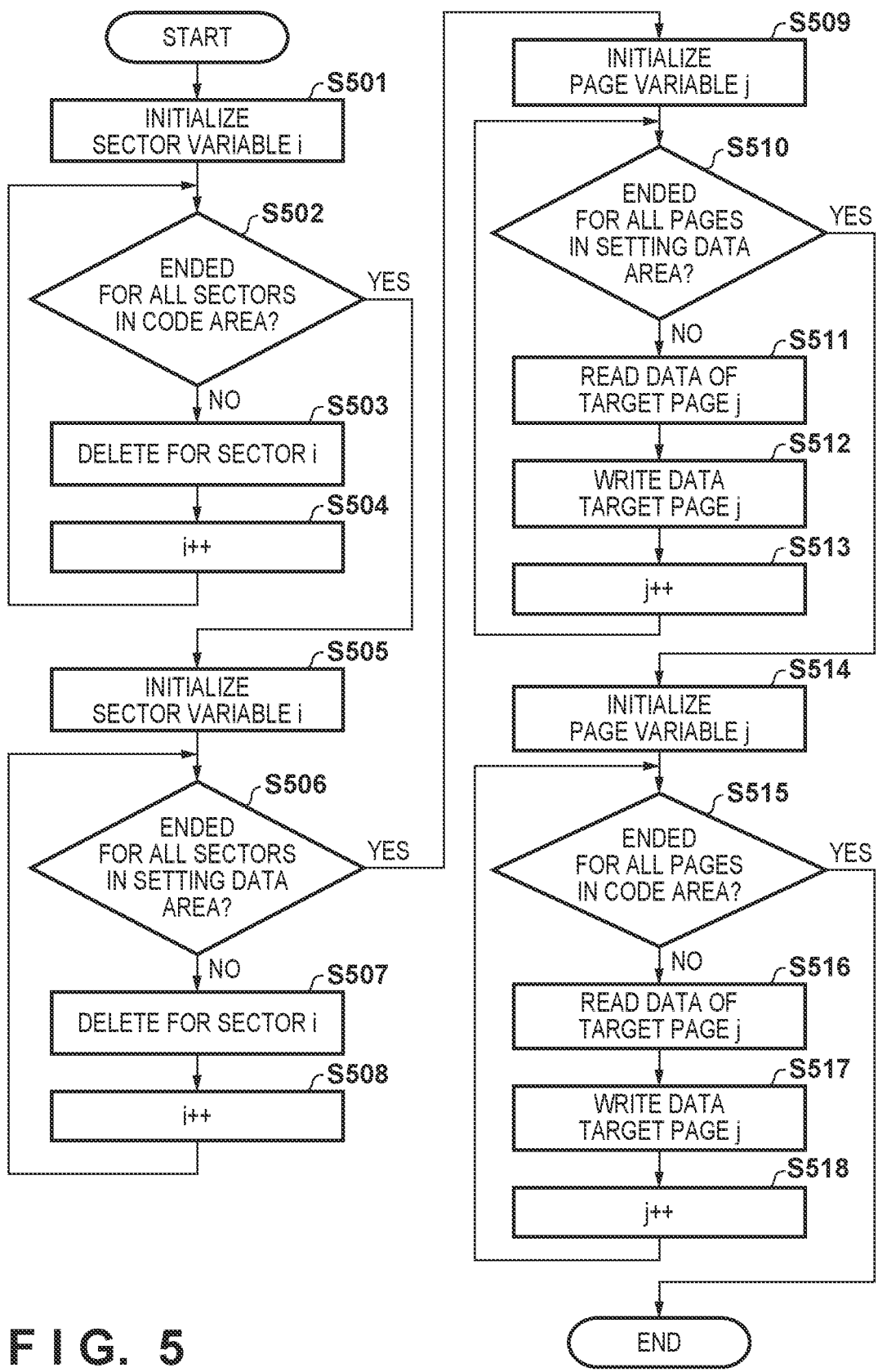
FIG. 5 is a flowchart for the non-volatile memory update processing according to an embodiment.

Next, referring to FIG. 5, the process of updating the ROM 122 which is the non-volatile memory according to the present embodiment will be described. The process described below is detail of the process performed in the above-described step S421, and is executed by the automatic recovery microcomputer 135. In the present embodiment, the processing for rewriting the non-volatile memory comprises four steps. In addition, it is assumed that the rewriting of data to the non-volatile memory is performed in two stages: deletion performed on a sector-by-sector basis and writing performed on a page-by-page basis.

In step S501, the automatic recovery microcomputer 135 initializes the sector variable i corresponding to the sectors of the code area 211 to 0. Subsequently, in step S502, the automatic recovery microcomputer 135 compares the number of sectors of the sector variable i and the code area 211, and determines whether the process has ended for all sectors of the code area 211. If not, the process proceeds to step S503. In step S503, the automatic recovery microcomputer 135 notifies to the non-volatile memory 122 a command for deleting a target sector indicated by a sector variable i. Here, the non-volatile memory 122 deletes the contents of the target sector, to put the target sector in a state in which new data can be rewritten. The code area 211 enters a state of data corruption upon this processing being started. Thereafter, in step S504, the automatic recovery microcomputer 135 increments the sector variable i and returns the process to step S502. Meanwhile, if it is determined in step S502 that the processing has ended for all the sectors in the code area 211, the automatic recovery microcomputer 135 advances the processing to step S505. Here, data erasure in the code area 211 is completed.

In step S505, the automatic recovery microcomputer 135 again initializes the sector variable i to 0. Subsequently, in step S506, the automatic recovery microcomputer 135 compares the number of sectors of the sector variable i and the setting data area 212, and determines whether the process has ended for all sectors of the setting data area 212. If not, the process proceeds to step S507. In step S507, the automatic recovery microcomputer 135 notifies to the non-volatile memory 122 a command for deleting a target sector indicated by a sector variable i. Here, the non-volatile memory 122 deletes the contents of the target sector, to put the target sector in a state in which new data can be rewritten. The setting data area 212 is in a state of data corruption upon this processing being started. Thereafter, in step S508, the automatic recovery microcomputer 135 increments the sector variable i and returns the process to step S506. Meanwhile, if it is determined in step S506 that the processing has ended for all the sectors in the setting data area 212, the automatic recovery microcomputer 135 advances the processing to step S509. Here, data erasure in the setting data area 212 is completed.

Next, in step S509, the automatic recovery microcomputer 135 initializes a page variable j corresponding to the pages of the setting data area 212 to 0. Subsequently, in step S510, the automatic recovery microcomputer 135 compares the page variable j and the number of pages of the setting data area 212, and determines whether the process has ended for all pages of the setting data area 212. If not, the process proceeds to step S511. In step S511, the automatic recovery microcomputer 135 reads the data of the target page indicated by the page variable j. Here, the automatic recovery microcomputer 135 notifies to the non-volatile memory 122 a command for reading the contents of the corresponding page of the backup unit 202, and acquires data by receiving the response thereto. Subsequently, in step S512, the automatic recovery microcomputer 135 notifies to the non-volatile memory 122, together with the data, a command for writing the page for which the data was acquired. The non-volatile memory 122 overwrites the contents of the target page with the contents of the data. Thereafter, in step S513, the automatic recovery microcomputer 135 increments the page variable j and returns the process to step S510. Meanwhile, if it is determined in step S510 that the processing has ended for all the pages in the setting data area 212, the automatic recovery microcomputer 135 advances the processing to step S514. Here, the data write in the setting data area 212 is completed, and the data corruption state of the setting data area 212 is canceled.

In step S514, the automatic recovery microcomputer 135 initializes the page variable j corresponding to the pages of the code area 211 to 0. Subsequently, in step S515, the automatic recovery microcomputer 135 compares the number of pages of the page variable j and the code area 211, and determines whether the process has ended for all pages of the code area 211. If not, the process proceeds to step S516. In step S516, the automatic recovery microcomputer 135 reads the data of the target page indicated by the page variable j. Here, the automatic recovery microcomputer 135 notifies to the non-volatile memory 122 a command for reading the contents of the corresponding page of the backup unit 202, and acquires data by receiving the response thereto. Subsequently, in step S517, the automatic recovery microcomputer 135 notifies to the non-volatile memory 122, together with the data, a command for writing the page for which the data was acquired. The non-volatile memory 122 overwrites the contents of the target page with the contents of the acquired data. Thereafter, in step S518, the automatic recovery microcomputer 135 increments the page variable j and returns the process to step S515. Meanwhile, if it is determined in step S515 that the processing has ended for all pages in the code area 211, the automatic recovery microcomputer 135 ends the processing. Here, the data write in the code area 211 is completed, the data corruption state of the code area 211 is resolved.

As described above, the information processing apparatus (image forming apparatus) according to the present embodiment includes a non-volatile memory having a first portion including a code area for holding a program and a data area for holding data. In addition, the information processing apparatus acquires update data of a first portion, and updates the first portion with the acquired update data. In the updating process, at least a portion of the program held in the code area is deleted before updating the contents of the data area, and after updating the contents of the data area, updating to the code area is completed. As described above, according to the present embodiment, before deleting at least a portion of the content of the setting data area 212, at least a portion of the content of the code area 211 is deleted. Further, after writing of all of the content of the setting data area 212 has ended, writing of all of the content of the code area 211 is ended. More specifically, according to the present embodiment, the deletion processing and the write processing (step S505 to step S513) of the setting data area 212 are performed while the code area 211 is in a corrupted state. By this, it is possible to enhance, in a non-volatile memory in which both a code area and a setting data area are provided on one non-volatile memory, failure tolerance against forced interruption during processing for updating of the non-volatile memory.

Even if a power disconnection occurs at an arbitrary timing before writing to all pages in the code area 211 is completed, the content of the code area 211 will be corrupted and the signature verification processing (step S401 to step S410) will fail. If the signature verification processing fails, the contents of the setting data area 212 will also be recovered along with the code area 211 from the backup unit 202. Thus, it is possible to prevent the CPU 121 from executing a command sequence in the code area 211 upon an update due to a reactivation where only the setting data area 212 has not been updated. That is, according to the present embodiment, when the content of the setting data area is deleted and its data is corrupted, the content of the code area will always also be in a state where the data is corrupted. When the update of the contents of the setting data area has completed, the writing of all the contents of the code area has ended. Therefore, the information processing apparatus only takes a state in which both the code area and the setting data area are yet to be updated, a state where at least the code area is corrupted, or a state where updating has completed. If the code area is corrupted, the information processing apparatus recovers both the code area and the setting data area from the backup unit by the automatic recovery function. Therefore, in the information processing apparatus, although the code area is updated, it is possible to avoid activating in a state where the setting data area has not been updated or the data is corrupted.

The sequence of the processing for updating the non-volatile memory in the present embodiment is only one example in which the present invention is applied, and various modifications are possible. For example, in the present embodiment, the automatic recovery microcomputer 135 has been described in a form of executing a process of all-at-once writing after all-at-once deletion processing for the code area 211. However, the present invention is not limited to this, and for example, a portion of the code area may be defined as a holding area, an area different from the holding area in the code area 211 may be deleted and written, the setting data area 212 may be deleted and written, and then the holding area may be deleted and written. Alternatively, configuration may be taken so as to delete all of the code area, delete all of the setting data area, and write the update data to an area different from the holding area of the code area, and then write to the setting data area 212 and write the update data to a different area of the code area. Even in these cases, an effect equivalent to that of the present embodiment can be achieved.

As another modification, if the setting data area 212 is located at the end of the boot unit 201, the present invention can be applied whether the deletion of each sector is performed in ascending order or the writing of each page is performed in descending order. In this case, the first page of the boot area is deleted by the first sector deletion and updated by the last page write.

Further, the present invention can be applied if the following two conditions are satisfied. A first condition is that before deleting at least a portion of the content of the setting data area 212, at least a portion of the content of the code area 211 is deleted. A second condition is that after writing all of the content of the setting data area 212 ends, writing of all of the content of the code area 211 ends. That is, the second condition is that the code area 211 is in a state in which its data is corrupted during the period from the deletion of the contents of the setting data area 212 to the end of the writing. As a result, when a power disconnection occurs during the data processing on the setting data area 212, the content of the code area 211 is in a state in which its data is corrupted, and therefore, the automatic recovery processing can be performed at the time of the next activation.

Second Embodiment

Hereinafter, a second embodiment of the present invention will be described. In the present embodiment, the firmware update processing in the image forming apparatus will be mainly described. Description of the same configuration and control as those of the above first embodiment is omitted.

Figure 6:
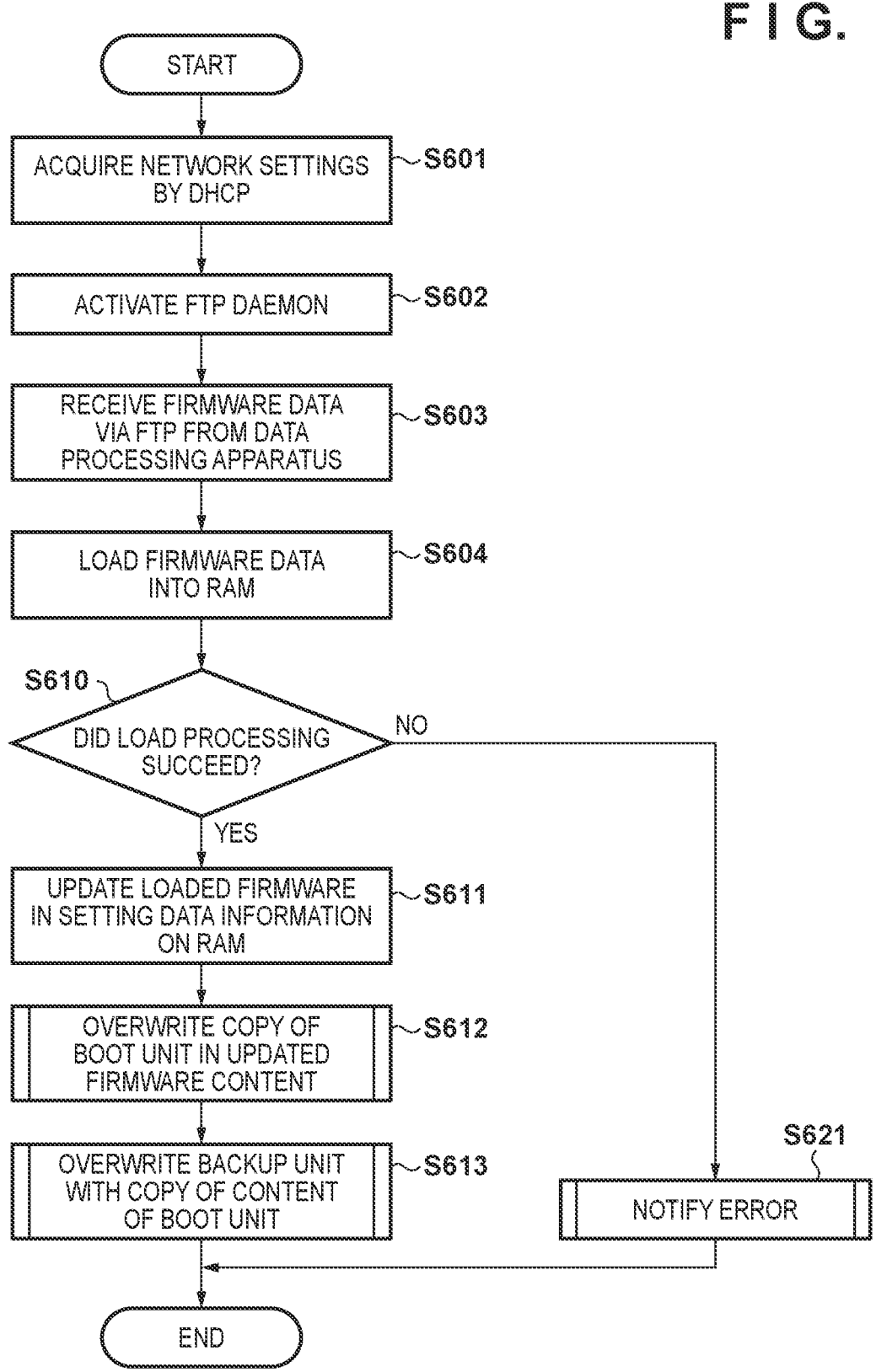
FIG. 6 is a flowchart for firmware update processing according to an embodiment.

Next, a processing procedure of firmware update processing according to the present embodiment will be described with reference to FIG. 6. The process described below is realized by the CPU 121 executing a firmware updating program 372, which is one of the applications 371 activated in the above step S342. It should be noted that the present invention is not intended to be limited, and the present invention may be provided as one function of, for example, bootable, which is executed in step S331 (specifically, a program included in the code area 211). A trigger to start the firmware update process may be used, or various triggers may be used. The user 300 may explicitly issue an instruction to the image forming apparatus 102 from the UI panel 111. Further, the image forming apparatus 102 may make a query to an external server (not shown) via the NIC 124 every time a predetermined period of time elapses. Alternatively, an update instruction may be issued from an external server (not shown) to the image forming apparatus 102 via the NIC 124. An example in which the user 300 may explicitly issue an instruction to the image forming apparatus 102 from the UI panel 111 will be described. The instruction is received by the CPU 121 that executes the firmware updating program 372, and the following processing is executed.

First, in step S601, the CPU 121 notifies DHCP server 104 of the MAC address information and acquires the network setting corresponding to the MAC address. The MAC address information 226 and 227 included in the setting data area 212 is used as the MAC address information. Details of acquiring network settings by DHCP are omitted because they are common technical methods.

Then, in step S602, the CPU 121 starts an FTP daemon. The FTP daemon is a server program that supports File Transfer Protocol and uploads and downloads files based on requests from FTP client software. The CPU 121 waits for an external FTP connection request. Subsequently, in step S603, the CPU 121 receives firmware data from the data processing apparatus 101 over FTP and stores the received firmware data in the RAM 123. Then, in step S604, the CPU 121 loads the received firmware data into the RAM 123. Firmware data is a file in which firmware is easily distributed over a network. For example, the firmware data may be compressed beforehand, and content that is compressed at the time of the load to the RAM 123 may be loaded. Alternatively, the firmware data may be encrypted beforehand, and may be decrypted at the time of load to the RAM 123. Various methods can be applied in applying the present invention.

Then, in step S610, the CPU 121 determines whether the firmware can be successfully loaded from the firmware data. If the firmware can be successfully loaded, the processing proceeds to step S611 and the CPU 121 updates the area corresponding to the setting data area 212 included in the firmware already loaded in the RAM 123. After the load to the RAM 123, no product-specific information is recorded in the area. In this step, the content of the setting data area 212 is copied to the corresponding area of the loaded firmware on the RAM 123. Thus, even after updating the firmware, it is possible to inherit the data from before updating the contents of the setting data area 212.

Subsequently, in step S612, the CPU 121 overwrites a copy of the boot unit 201 based on the updated firmware content. This process is realized by performing the flowchart of the process for updating the non-volatile memory illustrated in FIG. 5 by the firmware updating program 372 (the CPU 121). Then, in step S613, the CPU 121 updates the content of the backup unit 202 based on the content of the boot unit 201. Note that since the contents of the boot unit 201 and the contents of the updated firmware are the same, the contents of the backup unit 202 may be updated using the contents of the updated firmware. Then, the firmware update process ends.

Meanwhile, if the firmware cannot be successfully loaded in step S610, the processing proceeds to step S621, and the CPU 121 notifies the user of the error and interrupts the firmware update process. Specifically, the error notification is performed via the UI panel 111 to notify that the activation process has failed by sound, light, or the like. Here, although an example of notifying an error in step S621 and interrupting the firmware update process has been described, there is no intention to limit the present invention to such error control. For example, when the firmware for updating is received again, the update process may be continued using the firmware.

As described above, according to the present embodiment, the process for updating the non-volatile memory can be applied not only at the time of automatic recovery of the firmware but also at the time of updating the firmware. Incidentally, the network protocol for receiving the firmware data used in the present embodiment is only an example. Other network protocols can be used to apply the present invention. For example, the network setting may be acquired using BOOTP (Bootstrap Protocol) instead of DHCP. Alternatively, instead of acquiring the network setting from the external server by the firmware updating program 372, a fixed value may be stored and set each time the firmware is updated.

By virtue of the present invention it is possible to enhance, in a non-volatile memory in which both a code area and a setting data area are provided on one non-volatile memory, failure tolerance against forced interruption during processing for updating of the non-volatile memory.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-003727, filed Jan. 13, 2021, which is hereby incorporated by reference herein in its entirety.

What is claimed is:

1. An information processing apparatus comprising:
a non-volatile memory that has a first portion including a code area configured to hold a program and a data area configured to hold data; and
at least one processor that executes a program to:
acquire update data for the first portion, and
update the first portion by the acquired update data,
wherein the at least one processor executes a program in the non-volatile member to delete all of the program held in the code area before updating contents of the data area, and thereafter, delete data held in the data area, and to write update data to the data area, and thereafter write the update data to the code area.

2. The information processing apparatus according to claim 1, wherein the non-volatile memory further includes a second portion that is a backup area for data held in the first portion, and
wherein the at least one processor executes a program in the non-volatile memory to acquire update data of the first portion from the second portion of the non-volatile memory.

3. The information processing apparatus according to claim 2, wherein the at least one processor executes a program in the non-volatile memory to acquire firmware as update data from an external apparatus.

4. The information processing apparatus according to claim 3, wherein the at least one processor executes a program in the non-volatile memory to, after the firmware is written to the first portion, write the firmware to the second portion.

5. The information processing apparatus according to claim 1, further comprising another non-volatile memory having a second portion that is a backup area for data held in the first portion,
wherein the at least one processor executes a program in the non-volatile memory to: acquire update data of the first portion from the second portion of the other non-volatile memory.

6. The information processing apparatus according to claim 1, wherein the at least one processor executes a program in the non-volatile memory to verify a validity of content held in the first portion, and, in a case where the verification failed, update the first portion.

7. The information processing apparatus according to claim 6, wherein signature data for executing the verification is held in the code area.

8. The information processing apparatus according to claim 7, wherein the at least one processor executes a program in the non-volatile memory to decrypt the signature data with a public key, acquire a first digest, use a hash function in relation to other data different to the signature data in the code area to acquire a second digest, and, by comparing the first digest and the second digest, verify a validity of content held in the first portion.

9. The information processing apparatus according to claim 7, wherein the at least one processor executes a program in the non-volatile memory to:
verify a validity of content of the code area using the signature data, and
verify a validity of content of the data area using an error detection code.

10. The information processing apparatus according to claim 6, wherein the at least one processor executes a program in the non-volatile memory to notify an error to a user in a case where verification of at least one of the code area and the data area failed.

11. The information processing apparatus according to claim 1, wherein a program for at least one product is stored in the code area, and setting data specific to at least one product is stored in the data area.

12. An information processing apparatus comprising:
a non-volatile memory that has a first portion including a code area configured to hold a program and a data area configured to hold data, wherein the code area includes a holding area; and
at least one processor that executes a program to:
acquire update data for the first portion, and
update the first portion by the acquired update data,
wherein the at least one processor executes a program in the non-volatile memory to delete all of the program held in the code area before updating contents of the data area, and thereafter delete the data held in the data area, and to write update data to an area different from the holding area of the code area, and write update data to the data area, and thereafter write update data to the holding area of the code area.

13. An information processing apparatus comprising:
a non-volatile memory that has a first portion including a code area configured to hold a program and a data area configured to hold data, wherein the code area includes a holding area; and
at least one processor that executes a program to:
acquire update data for the first portion, and
update the first portion by the acquired update data,
wherein the at least one processor executes a program in the non-volatile memory to delete a program held in an area different from a holding area of the code area and write update data before updating contents of the data area, and thereafter delete data held in the data area, and write update data, and thereafter delete a program held in the holding area of the code area and write update data.

14. A method of controlling an information processing apparatus comprising a non-volatile memory that has a first portion including a code area for holding a program and a data area for holding data, the method comprising:
acquiring update data for the first portion; and
updating the first portion by the acquired update data,
wherein, in the updating, all of the program held in the code area is deleted before updating contents of the data area, and thereafter the data held in the data area is deleted, update data is written to an area different from a holding area of the code area, update data is written to the data area, and thereafter update data is written to the holding area of the code area.

15. A non-transitory storage medium operable to store a program for causing a computer to execute each step of a method of controlling an information processing apparatus comprising a non-volatile memory that has a first portion including a code area for holding a program and a data area for holding data, the method comprising:
acquiring update data for the first portion; and
updating the first portion by the acquired update data,
wherein, in the updating, all of the program held in the code area is deleted before updating contents of the data area, and thereafter the data held in the data area is deleted, update data is written to an area different from a holding area of the code area, update data is written to the data area, and thereafter update data is written to the holding area of the code area.

* * * * *